United States Patent [19]
Mizuno

[11] Patent Number: 5,644,385
[45] Date of Patent: Jul. 1, 1997

[54] DISTANCE MEASURING DEVICE USING POSITION SENSITIVE LIGHT DETECTOR

[75] Inventor: Seiichiro Mizuno, Hamamatsu, Japan

[73] Assignee: Hamamatsu Photonics K.K., Shizuoka-ken, Japan

[21] Appl. No.: 429,618

[22] Filed: Apr. 28, 1995

[30] Foreign Application Priority Data

Apr. 28, 1994 [JP] Japan .................... 6-091558

[51] Int. Cl.$^6$ .................... G01C 3/00; G03B 3/00; G02B 7/04
[52] U.S. Cl. .................... 356/3.04; 250/201.6
[58] Field of Search .................... 356/3.04, 3.06, 356/3.07; 354/403, 106; 250/201.6

[56] References Cited

U.S. PATENT DOCUMENTS

| | | |
|---|---|---|
| 4,298,258 | 11/1981 | Matsuda et al. . |
| 4,490,037 | 12/1984 | Anagnostopoulos et al. .......... 354/403 |
| 4,521,106 | 6/1985 | Lambeth .................... 354/403 |
| 4,761,546 | 8/1988 | Ikari et al. . |
| 5,136,148 | 8/1992 | Nonaka .................... 354/403 |

FOREIGN PATENT DOCUMENTS

| | | |
|---|---|---|
| 3405784 | 8/1984 | Germany . |
| 59-142412 | 12/1984 | Japan . |
| 2118402 | 7/1990 | Japan . |
| 5232375 | 12/1993 | Japan . |

*Primary Examiner*—Stephen C. Buczinski
*Attorney, Agent, or Firm*—Sughrue, Mion, Zinn, Macpeak & Seas

[57] ABSTRACT

A distance measuring device includes a light emitting element which emits light toward an object to be distance measured. A distance to the object is computed based on photo-currents outputted from a semiconductor position sensitive light detector upon which the light reflected from the object is incident. Background light components coming from a background of the object is detected and canceled from the output obtained from the position sensitive light detector, and position information is outputted which is represented by temperature-dependent variables. Therefore, computation of the distance to the object is not affected by temperature.

10 Claims, 9 Drawing Sheets

DISTANCE MEASURING DEVICE USING POSITION SENSITIVE LIGHT DETECTOR

BACKGROUND OF THE INVENTION

1. Field of the Invention

The present invention relates to a distance measuring device for measuring a distance from the measuring device to an object by emitting light toward the object and detecting light reflected therefrom.

2. Description of the Prior Art

A distance measuring device having a semiconductor position sensitive light detector (hereinafter referred to as "PSD") has been extensively used particularly in autofocusing cameras. FIG. 1 schematically shows such a distance measuring device. The distance measuring device includes a PSD 10, a signal extraction circuit 20 connected to the PSD 10, and a distance computing circuit 30 connected to the signal extraction circuit 20. The PSD 10 is a silicon semiconductor having a 3-layer structure consisting of a P-layer, an I-layer and an N-layer. The PSD 10 receives a light spot on a light receiving surface and produces photocurrents $I_1$ and $I_2$ from output electrodes 11 and 12, respectively, depending on the position of the light spot incident on the light receiving surface. The signal extraction circuit 20 extracts wanted signal components from the currents $I_1$ and $I_2$ and cancels unwanted components contained in the currents $I_1$ and $I_2$, such as noise. The distance computing circuit 30 computes a distance from the measuring device to an object to be measured based on the extracted signal outputted from the signal extraction circuit 20. In the following description, a distance from the measuring device to an object to be measured or photographed will be simply referred to as "distance" unless mentioned specifically to refer to another distance.

The output electrodes 11 and 12 are provided at both ends of the P-layer of the PSD 10, and a common electrode is provided to the N-layer at a position apart by an equidistance from the output electrodes 11 and 12. A predetermined bias voltage $V_B$ is applied to the common electrode so that the P-N junction of the PSD 10 is operated in a reverse-biased condition. The P-layer serves as a light receiving surface upon which a light spot is incident. When the light is incident thereupon, the P-layer produces a photo-current $I_0$ according to a photo-electric conversion effect. The photo-current $I_0$ is divided into photo-currents $I_1$ and $I_2$. Specifically, the photo-current $I_1$ is given by $I_0 \times \{L_2/(L_1+L_2)\}$ and the photo-current $I_2$ is given by $I_0 \times \{L_1/(L_1+L_2)\}$. The distance $L_1$ is from the light spot incident position on the surface of the P-layer to the output electrode 11, and the distance $L_2$ is from the light spot incident position to the output electrode 12. The thus divided photocurrents $I_1$ and $I_2$ are applied to the signal extraction circuit 20.

The distance measuring device has a light emitting diode LED which emits a light spot toward the object 90 to be photographed. The LED is disposed apart by a predetermined distance from the PSD 10. The P-layer of the PSD 10 receives the light spot reflected from the object 90 (hereinafter referred to as "reflection light spot"). With such an arrangement, a principle of trigonometrical survey is applied to measure the distance. More specifically, there is a proportional geometrical relationship between the distance and the position of the reflection light spot incident upon the P-layer of the PSD 10, which position being defined by $L_1$ and $L_2$. Therefore, the distance can be computed if a current ratio of the photo-current $I_1$ to $I_2$ is given. This computation is performed by the distance computing circuit 30.

Because the P-layer of the PSD 10 has an area larger than the area upon which the reflection light spot is incident, the photo-currents $I_1$ and $I_2$ derived from the output electrodes 11 and 12 contain not only the reflection light spot but also background light and noise components. If the distance measurements are performed based simply on the photo-currents $I_1$ and $I_2$, the accuracy of the measured distance is lowered due to the inclusion of the background light and the noise components.

In light of the above, the noise cancellation circuit as shown in FIG. 2 is provided in the signal extraction circuit 20. Although FIG. 2 indicates the noise cancellation circuit coupled to the output electrode 11, the same circuit is coupled to the output electrode 12.

The noise cancellation circuit includes a buffer circuit having an operational amplifier $A_1$ which is d.c. biased with a bias voltage supply $V_{R1}$, and a PMOSFET $Q_1$. The buffer circuit d.c. biases the output electrode 11 to the voltage of the bias voltage supply $V_{R1}$ and also outputs an 10 amplified photo-current $I_1$ to a node x. As shown in FIG. 2, the node x is connected to the collector of an NPN transistor $Q_2$, the base of an NPN transistor $Q_3$, and the non-inverting input terminal of an operational amplifier $A_2$. A current mirror circuit configured by PNP transistors $Q_4$ and $Q_5$ is connected to the collector of the transistor $Q_3$. A series-connection of diodes $D_1$ and $D_2$ is connected to the collector of the transistor $Q_5$. A voltage $V_{01}$ developed across the diodes $D_1$ and $D_2$ is applied to the distance computing circuit 30. The operational amplifier $A_2$ has an inverting input terminal applied with a reference voltage $V_{R2}$, and an output terminal connected to the base of the transistor $Q_2$ through a switch SW. A capacitor C is connected between the base of the transistor $Q_2$ and ground.

In operation, the light emitting diode LED is turned OFF for a predetermined period of time τ. During the period of time the LED is OFF, the switch SW is closed to measure the background light. In this condition, a voltage $V_X$ corresponding to the light intensity of the background light appears on the node x. The operational amplifier $A_2$ performs subtraction of the reference voltage $V_{R2}$ from the voltage $V_X$, so that the capacitor C is charged with a voltage $V_h$ (=$V_X$-$V_{R2}$) corresponding to the light intensity of the background light. It should be noted that the reference voltage $V_{R2}$ corresponds to noises generated from the PSD 10 and the operational amplifier $A_2$ is provided for removing the noise component from the voltage $V_X$ appearing at the node x.

After expiration of the predetermined period of time τ, the switch SW is opened and the light emitting diode LED is turned ON, whereupon reception of the reflection light spot is performed for another predetermined period of time τ. The PSD 1 receives the reflection light spot together with the background light. The photo-current $I_1$ generated from the PSD 10 represents a sum of the background light and the reflection light spot. Because the voltage $V_h$ corresponding to the background light has been held in the capacitor C, the current corresponding to the background light flows in ground through the transistor $Q_2$. The voltage $V_X$ developed at the node x increases by a voltage corresponding to the reflection light spot. As a result, the current flowing in the transistor $Q_5$ of the current mirror circuit also increases depending on the voltage increase at the node x, and the voltage across the series-connection of the diodes $D_1$ and $D_2$ becomes the voltage corresponding to the light intensity of the light spot.

As described above, the voltage $V_h$ corresponding purely to the background light is held in the capacitor C in advance.

When the reflection light spot is received, the background light component contained in the reflection light spot is removed to obtain the voltage $V_{O1}$ representative of the components of only the reflection light spot. Because the same noise cancellation circuit is connected to the output electrode 12, the background light component is canceled out from the photo-current $I_2$ outputted from the output electrode 12 to obtain the voltage $V_{O2}$ representative of the components of only the reflection light spot. The voltages $V_{O1}$ and $V_{O2}$ are in proportional relation to the incident position of the reflection light spot (i.e., $L_1$ and $L_2$). Based on these voltages $V_{O1}$ and $V_{O2}$, the distance computing circuit 30 implements a predetermined computation to obtain the distance.

The voltage corresponding to the reflection light spot is represented by:

$$V_{O1}=(kT/q)ln\{(h_{fe1}\cdot\Delta I_{L1}+I_{L1})/I_S\} \quad (1)$$

where q is an electron charge; k, Boltzmann constant; T, an absolute temperature; $I_{L1}$, a collector current of the transistor $Q_2$ when only the background light is received; $\Delta I_{L1}$ is a base current of the transistor $Q_3$ when the reflection light spot is incident; $h_{fe1}$ is a current amplification factor of the transistor $Q_3$; and $I_S$ is a saturation current of the diodes $D_1$ and $D_2$.

Similar to the voltage $V_{O1}$, the voltage $V_{O2}$ produced by the noise cancellation circuit connected to the output electrode 12 is represented by:

$$V_{O2}=(kT/q)ln\{(h_{fe2}\cdot\Delta I_{L2}+I_{L2})/I_S\} \quad (2)$$

Accordingly, the difference between these two voltages $V_{Od}$ (=$V_{O1}-V_{O2}$) is given by:

$$V_{Od}=(2kT/q)ln\{(h_{fe2}\cdot\Delta I_{L2}+I_{L2})/I_S\}/(h_{fe1}\cdot\Delta I_{L1}+I_{L1})\} \quad (0)$$

Normally there is a relationship of $h_{fei}\cdot\Delta I_{Li} > I_{Li}$, and it is assumed that $h_{fe1} \sim h_{fe2}$. Thus, the following relationship is obtained:

$$V_{Od}=(2kT/q)ln(\Delta I_{L2}/\Delta I_{L1}) \quad (4)$$

Thus, the voltage difference $V_{Od}$ is determined by a logarithmic value of a ratio of two photo-currents changes. By performing a reverse logarithmic computation of the voltage difference $V_{Od}$ with the distance computing circuit 30, the distance can be obtained.

While the prior art is constructed to detect the light spot with excellent accuracy based on the principle described above, the following problems hinder effective detection of the light spot.

Problem on Accuracy of Capacitor Holding Voltage

In order for the capacitor C shown in FIG. 2 to hold the voltage corresponding to the background light, offset components and other noise components, it is necessary that the capacitor C be held in a cut-off condition when the switch SW is open. In actuality, however, the switch SW is not completely in the cut-off condition even if the switch SW is open, so that the charges in the capacitor C are caused to discharge and thus the voltage $V_h$ across the capacitor C lowers. As such, the voltage held in the capacitor C does not accurately represent the background light and/or offset components.

In order to solve the above-mentioned problem, Japanese Laid-Open Patent Publication No. 59-142412 proposes a noise cancellation circuit as shown in FIG. 3 wherein electric discharges held in the capacitor C are compensated for with the provision of a current mirror circuit configured by NPN transistors $Q_6$ and $Q_7$ and PNP transistors $Q_8$ and $Q_9$. The proposed noise cancellation circuit is effective provided that the current amplification factors $h_{fe}$ of the transistors $Q_2$ and $Q_7$ are the same. However, it is extremely difficult for these transistors $Q_2$ and $Q_7$ to have the same current amplification factor, therefore, the proposed noise cancellation circuit was not sufficiently effective. Far more serious problem exists in the proposed noise cancellation circuit in that the change of the background light which may occur during light emission toward the object to be photographed cannot be canceled.

Problem Resulting from Non-Uniformity of Circuit Elements

High accuracy noise cancellation circuit could not be achieved due to the difficulty in equating the current amplification factors of the transistors included in the noise cancellation circuit and thus an ideal current mirror circuit could not be configured. Further, in the circuit of FIG. 2, because the operational amplifier $A_2$ produces an offset voltage due to variation in the circuit components, the base voltages of the transistors $Q_2$ and $Q_3$ cannot be maintained at the same level. As a result, the currents flowing in the transistors $Q_4$ and $Q_5$ are out of a current mirroring condition, thereby causing to lower the accuracy.

Japanese Patent B2 Publication (Kokoku) No. 4-4087 discloses a technique for solving the problem caused by the variation of the circuit components. According to this technique, a plurality of PSDs and corresponding number of detection circuits are provided. Each time when emission of light spot and light reception are repeatedly carried out for several times, a detection circuit to which a particular PDS is connected is switched over to obtain various detection results with various combinations of the PDSs and the detection circuits, and to thus obtain an average detection result. This technique is, however, involved with another problem such that the circuit is large scaled and control timing becomes complicated.

Problem on Temperature Variation

As indicated in equation (4), because a constant (kT/q) is multiplied to a logarithmic value to give the voltage difference $V_{Od}$, the voltage difference $V_{Od}$ is greatly affected by temperature T. To eliminate the influence of temperature, a temperature monitoring circuit needs to be provided in or out of the semiconductor chip, and the voltage difference $V_{Od}$ needs to be corrected by the aid of a CPU while referring to temperature information supplied from the temperature monitoring circuit.

Japanese Laid-Open Patent Publication No. 5-2275 proposes a circuit arrangement shown in FIG. 4 to solve the above problem. The circuit includes a constant light canceling circuit 52 which cancels the background light component with the circuit shown in FIG. 2 or 3. The circuit further includes two integration circuits 56 and 57. In accordance with instruction signals generated from a timing circuit 53 and applied to switches 54 and 55, the integration circuit 56 is connected to the output of the constant light canceling circuit 52 only during the first half of the light emission and another integration circuit 57 is connected to the output of the constant light canceling circuit 52 only during the second half of the light emission. Each of the integration circuits 56 and 57 holds the integrated result. The two integrated results are added in an adder 58 and a subtraction of one integrated result from the other is calculated in a subtracter 59. After multiplying ½ to the subtracted result in a ½ multiplier 60, the output from the adder 58 and the output from the ½ multiplier 60 are added in an adder 61. The added result obtained from the adder 61 is not affected by the change in the background light even if the background light changes during emission of light toward the object to be photographed. That is, the output from the adder 61 faithfully reflects the intensity of real light spot component.

However, the circuit shown in FIG. 4 is involved with another problem to be described below.

Problem on Variation in Integration Properties

The circuit shown in FIG. 4 is configured under the assumption that the two integration circuits have identical properties. However, variations in integration capacity, offset of operational amplifiers or the like make it difficult to equalize the properties of integration circuits when they are formed into one chip. For this reason, excellent accuracy could not be attained with the circuit shown in FIG. 4.

Problem on Circuit Scale

The circuit shown in FIG. 4 is further disadvantageous in that the circuit scale becomes too large, because two integration circuits 56, 57, subtracter 56, ½ multiplier 60, and adder 61 are required. When those components are formed into one chip, problems arise on consumed power and layout size. Contemplation of forming PSD, LED and those components into a plurality of arrays cannot be accomplished because the circuit scale becomes too large.

SUMMARY OF THE INVENTION

The present invention has been made in view of the foregoing circumstance, and it is an object of the present invention to provide a distance measuring device which is simple in construction and which improves measurement accuracy and temperature-dependent property.

To achieve the above and other objects, there is provided a distance measuring device which includes a light emitting element for emitting distance measuring light toward an object to be distance measured, position sensing means having a light receiving surface at which the distance measuring light reflected from the object is received, the position sensing means photoelectrically converting the distance measuring light to electrical signals indicative of a position of the distance measuring light received at the light receiving surface, noise detecting means for detecting noise components contained in the electrical signals, noise canceling means for canceling noise components from the electrical signals and outputting distance information represented by temperature-independent variables, and distance computing means for computing a distance to the object based on the distance information, whereby the distance computed is not affected by the temperature.

The noise detecting means detects background light components coming from a background of the object, and the noise canceling means cancels the background light components from the electrical signals.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

A distance measuring device according to one preferred embodiment of the present invention will be described while referring to the accompanying drawings.

Figure 5:
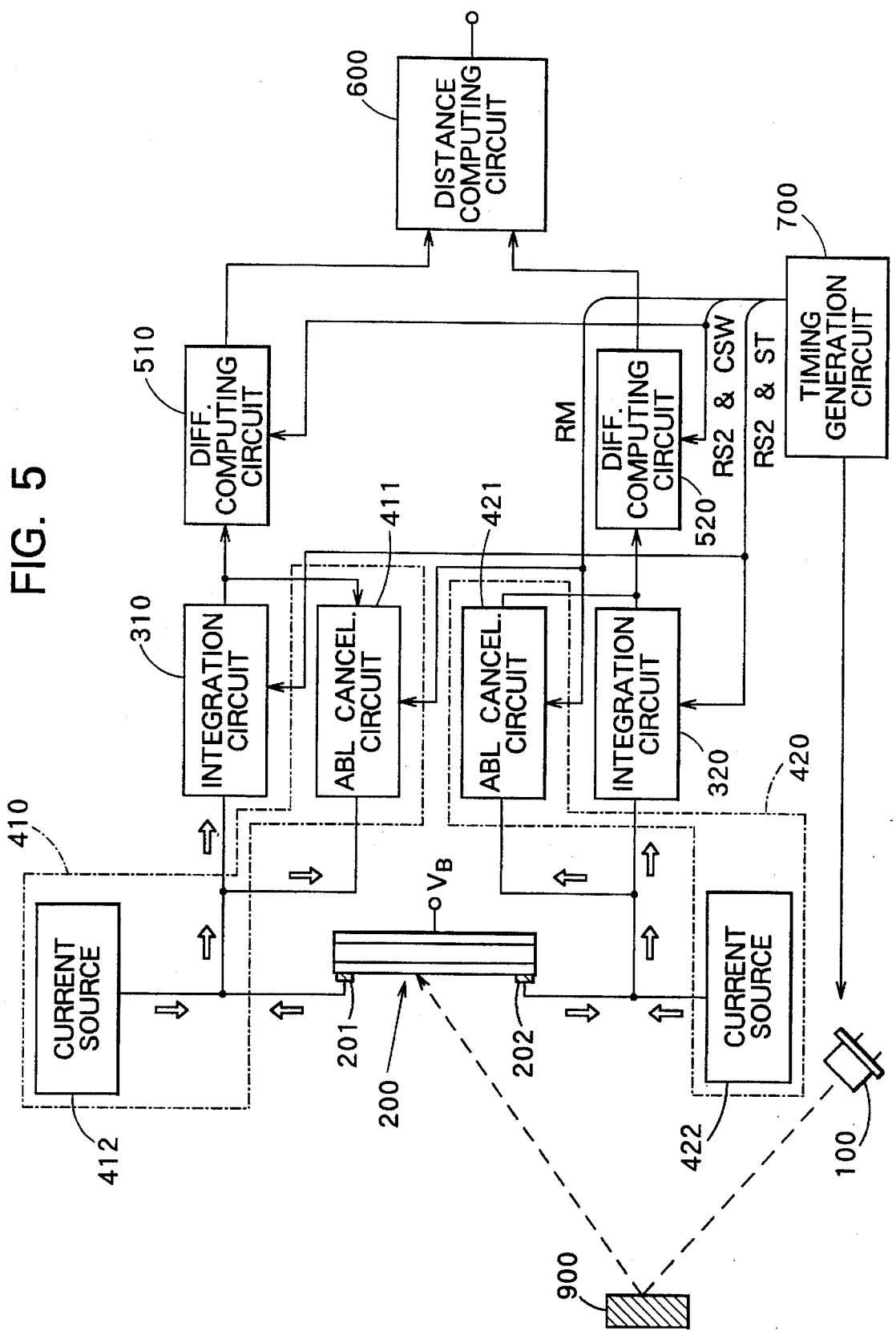
FIG. 5 shows an arrangement of a distance measuring device according to a preferred embodiment of the present invention.

FIG. 5 shows an arrangement of a distance measuring device according to the embodiment of the present invention. As shown in FIG. 5, the distance measuring device includes a light emitting element 100 for emitting light toward an object 900 and a semiconductor position sensitive light detector (PSD) 200 serving as light receiving element. The PSD 200 has a light receiving surface, a first output terminal 201, and a second output terminal 202. The light receiving surface of the PSD 200 receives reflection light and background light. The reflection light is the one emitted from the light emitting element 100 and reflected from the object 900. The background light is the one that comes from a background of the object. The PSD 200 photoelectrically converts the reflection light to a reflection current and the background light to a background current. When the PSD 200 receives both the reflection light and the background light, a sum of the reflection current and the background light is outputted from the PSD 200. The reflection current is divided into a first reflection current and a second reflection current, and the background current is divided into a first background current and a second background current. The first reflection current and the first background current are outputted from the first output terminal 201, and the second reflection current and the second reflection current are outputted from the second output terminal 202. A ratio of the currents outputted from the first output terminal 201 and the second output terminal 202 is determined depending on an intensity distribution of light received at the light receiving surface of the PSD 200.

There is provided a first cancellation circuit 410 operatively connected to the first output terminal 201 of the PSD 200. The first cancellation circuit 410 includes a first average background light (ABL) cancellation circuit 411 and a first constant current source 410, and is provided for canceling a first reference background current from a current outputted from the first output terminal 201 of the PSD 200 and outputting a first modified current. The first constant current source 410 adds a constant current to the current outputted from the first output terminal 201, and the first ABL cancellation circuit 310 cancels the sum of the constant current and an average background current from the current supplied from the first output terminal 201. The first constant current source 410 is provided for ensuring the average background current to flow in the first ABL cancellation circuit for cancellation.

A first integration circuit 310 is connected to receive the first modified current and is controlled to integrate the first modified current. When the light emitting element 100 is OFF, the first integration circuit 310 integrates the first modified current for a first predetermined period of time and outputs a first pre-integrated value which is an integrated value of variations of the first background current. Thereafter, the light emitting element 100 is turned ON and the first integration circuit 310 integrates the first modified current for the same duration to output a first post-integrated value which is an integrated value of the sum of the reflected current and the variations of the first background current.

A first difference computing circuit is operatively connected to the output terminal of the first integration circuit for computing a difference between the first pre-integrated value and the first post-integrated value and outputting a first distance information signal.

To the second output terminal 202 of the PSD 200, a second cancellation circuit 420, a second integration circuit 320, and a second difference computing circuit 520 are connected in the same manner as described. The integration circuits 310 and 320 are similarly constructed, and so does the cancellation circuits 410 and 420, the constant current sources 412 and 422, and the difference computing circuits 510 and 520. Specifically, the current signals outputted from the terminals 201 and 202 are subjected to exactly the same processing and the resultant signals are applied to a distance computing circuit 600 which computes a distance to the object based on the first distance information signal and the second distance information signal. To execute the above-described processings, a timing generation circuit 700 is provided.

As shown in FIG. 5, a pair of noise cancellation circuits are connected between the first output electrode 201 of the PSD 200 and the distance computing circuit 600 and between the second output electrode 202 and the distance computing circuit 600. Because two noise cancellation circuits are identically configured and operate exactly in the same manner, a counterpart thereof will be described while referring to FIG. 6. The noise cancellation circuits are provided to cancel noises contained in the photo-currents outputted from the output electrodes 201 and 202.

Figure 6:
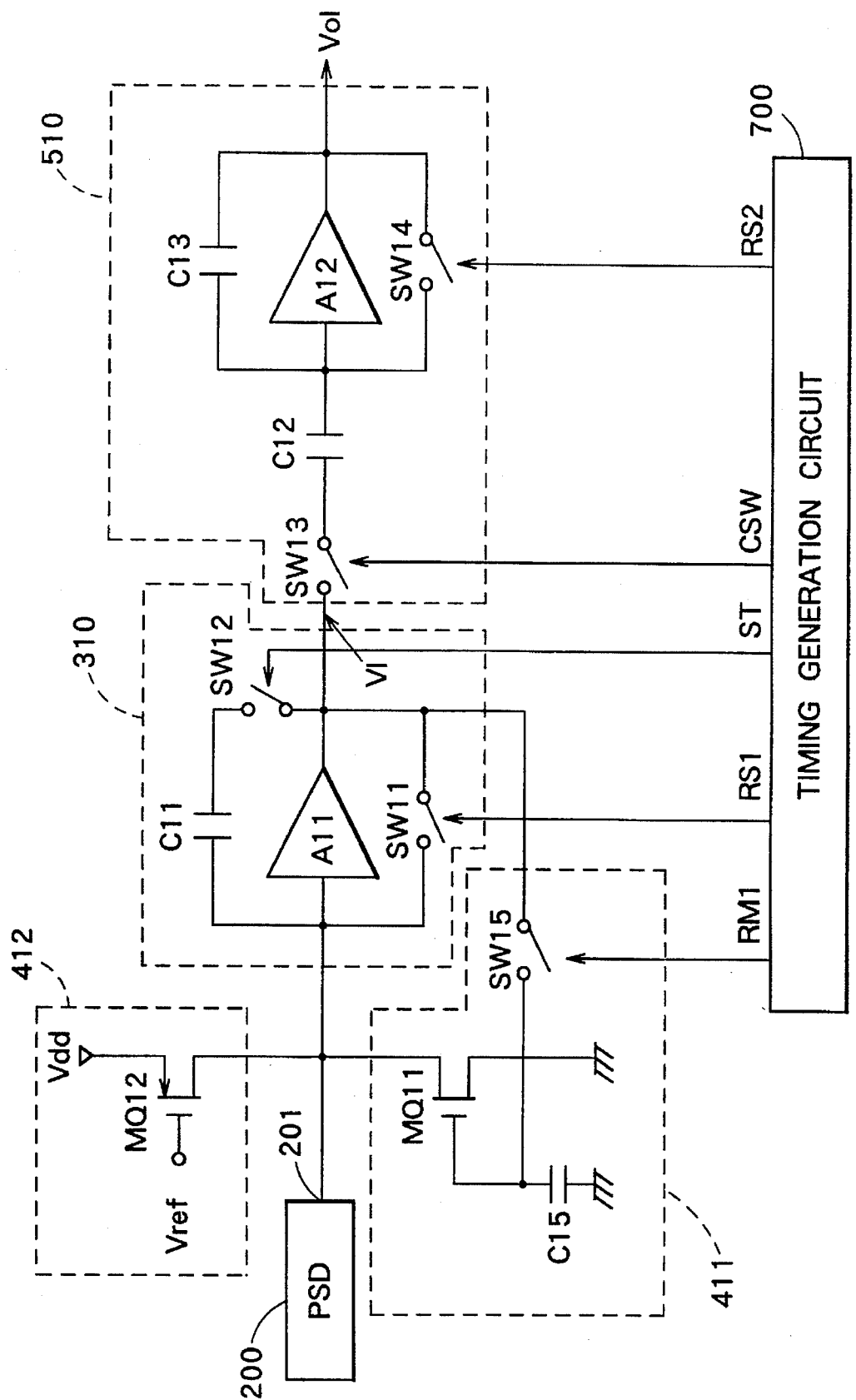
FIG. 6 is a circuit diagram showing a noise cancellation circuit used in conjunction with the device shown in FIG. 5.

Referring to FIG. 6, the integration circuit 310 connected to the output electrode 201 includes an amplifier $A_{11}$ for amplifying a photo-current $I_1$ outputted from the output electrode 201 of the PSD 200, a capacitor $C_{11}$ connected between the input and output terminals of the amplifier $A_{11}$, a first switch $SW_{11}$ provided between the input and output terminals of the amplifier $A_{11}$, and a second switch $SW_{12}$ provided between the capacitor $C_{11}$ and the output terminal of the amplifier $A_{11}$. Under the condition in which the second $SW_{12}$ is closed in response to an on/off signal ST from the timing generation circuit 700, when the first switch $SW_{11}$ is opened in response to a reset signal RS1 from the timing generation circuit 700, the photo-current $I_1$ is charged in the capacitor $C_{11}$ whereas when the first switch $SW_{11}$ is closed in response to the reset signal RS1, the electric charges held in the capacitor $C_{11}$ are discharged. The capacitance of the capacitor $C_1$ is see to several picofarads (pF) to set an integration operating time of the integration circuit 310 to several microseconds.

The current source 412 and the ABL cancellation circuit 411 are connected to the input terminal of the integration circuit 310, i.e., the output electrode 201 of the PSD 200. The current source 412 supplies a constant current, and the ABL cancellation circuit 411 cancels the current supplied from the current source 412 and a current corresponding to an average background light. The current source 412 includes a MOS transistor $MQ_{12}$ having a source terminal connected to a source voltage $V_{dd}$, a gate terminal supplied with a reference voltage $V_{ref}$, and a drain terminal connected to the input terminal of the integration circuit 310. A constant current is supplied from the drain terminal of the transistor $MQ_{12}$. The ABL cancellation circuit 411 includes a MOS transistor $MQ_{11}$ having a source terminal connected to the input terminal of the integration circuit 310, a drain terminal connected to ground, and a gate terminal connected to ground through a capacitor $C_{15}$.

The output of the integration circuit 310 is coupled through a switch $SW_{15}$ to the gate terminal of the MOS transistor $MQ_{11}$, wherein the switching actions of the switch $SW_{15}$ are controlled in accordance with an RM1 signal generated from the timing generation circuit 700. The output of the integration circuit 310, i.e., the output terminal of the amplifier $A_{11}$, is connected to the difference computing circuit 510 which includes a switch $SW_{13}$, a capacitor $C_{12}$, an amplifier $A_{12}$, a capacitor $C_{13}$ and a switch $SW_{14}$. The capacitor $C_{13}$ and the switch $SW_{14}$ are connected in parallel across the input and output terminals of the amplifier $A_{12}$. The output terminal of the difference computing circuit 510 is derived from the output terminal of the amplifier $A_{12}$. In view of balances between operational speed margin and noise margin in the overall circuit, the capacitances of capacitors $C_{12}$ and $C_{13}$ are both set to about 1 pF. The switch $SW_{13}$ performs switching actions in response to a change-over signal CSW supplied from the timing generation circuit 700. The difference computing circuit 510 performs clamping operation when the switch $SW_{14}$ is opened in response to a reset signal RS2 supplied from the timing generation circuit 700 whereas the circuit 510 halts the clamping operation when the switch $SW_{14}$ is closed in response to the reset signal RS2.

Figure 7:
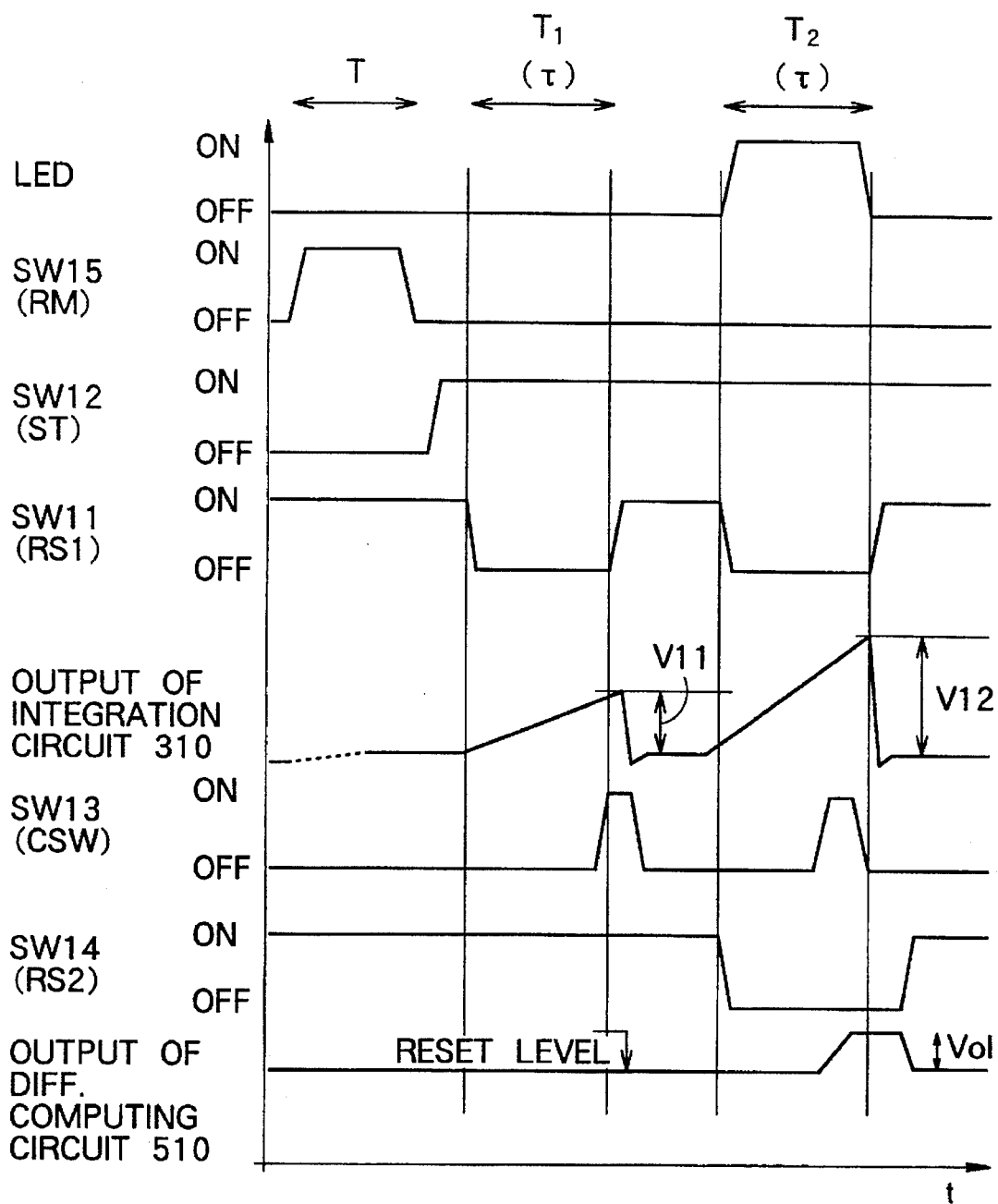
FIG. 7 is a timing chart illustrating operation of the noise cancellation circuit shown in FIG. 6.

Next, operation of the noise cancellation circuit thus constructed will be described while referring to the timing chart shown in FIG. 7. Light detecting sequence is divided into three stages including an average background light detecting period T, a background light variation detecting period T1, and a light spot plus background light variation detecting period T2.

During the average background light detecting period T, the LED 100 is turned OFF and the switch $SW_{15}$ is closed. Therefore, only the background light is received in a condition where the light spot is not emitted from the LED 100. The timing generation circuit 700 closes the switch $SW_{11}$ and opens the switch $SW_{12}$, whereby the integration circuit 310 is disabled. In this condition, a sum of a current supplied from the current source 412 and a photocurrent from the output electrode 201 of the PSD 200 is supplied to the input terminal of the integration circuit 310. The output voltage from the integration circuit 310 is applied to the gate terminal of the MOS transistor $MQ_{11}$. Accordingly, the sum of the currents supplied to the input circuit 411. In this condition, the voltage $V_{gs}$ developed terminal of the integration circuit 310 can entirely be absorbed in the MOS transistor $MQ_{11}$ of the ABL cancellation across the gate and source of the MOS transistor $MQ_{11}$ is expressed by:

$$V_{gs}=(2\times I_T/\beta)^{1/2}+V_{th}$$

where $I_T$ is a current value flowing in the MOS transistor $MQ_{11}$, $\beta$ is a predetermined constant determined owing to the size of the MOS transistor $MQ_{11}$, and $V_{th}$ is a threshold value of the MOS transistor $MQ_{11}$.

After expiration of a time T, the switch $SW_{15}$ is opened, so that a sum of the current corresponding to the average background light and the current supplied from the current source 412 flow into the MOS transistor $MQ_{11}$. The current source 412 is provided to force the current to flow in the transistor $MQ_{11}$ regardless of the fluctuation in the amount of the background light.

Next, the switch $SW_{12}$ is closed to render the integration circuit 310 in an enabled condition, whereupon the background light variation detecting period T1 (time duration: $\tau$) starts. During the period T1, the switch $SW_{11}$ is opened. A current corresponding to the background light variation is supplied to the integration circuit 310 and is charged in the capacitor $C_{11}$. As a result, the output of the integration circuit 310 gradually increases. Integrated voltage $V_{11}$ outputted from the integration circuit 310 after expiration of the time T and the current $I_d$ corresponding to the background light variation have the following relationship:

$$V_{11}=I_d\cdot\tau/C_{11} \quad (5)$$

During the detection period T2 (duration: $\tau$) for detecting a sum of reflected light spot and the background light variation, the LED 100 is turned ON whereat both the switches $SW_{11}$ and $SW_{14}$ are simultaneously opened. As a result of such switching actions, the integration circuit 310 charges the photo-current $I_1$ corresponding to the sum of the background light variation and the reflection light spot in the capacitor $C_{11}$.

When time $\tau$ has been expired, the following relation exist regarding an integrated voltage $V_{12}$ generated from the integration circuit 310, a current $I_{sh}$ corresponding to the reflection light spot, and a current $I_d$ corresponding to the background light variation.

$$V_{12}=(I_{sh}+I_d)\cdot\tau/C_{11} \quad (6)$$

After the period of time $T_2$ has been expired, the switch $SW_{13}$ is momentarily closed so that the integrated voltage $V_{12}$ is applied to the difference computing circuit 510. The difference computing circuit 510 is in a reset condition during the period of time T1 and performs subtraction operation during the period of time T2. Therefore, electric charges represented by the following equation are held in the capacitors $C_{12}$ and $C_{13}$.

$$(V_{12}-V_{11})\cdot C_{12}=V_{01}\cdot C_{13} \quad (7)$$

Substituting equations (5) and (6) into equation (7), the output signal $V_{01}$ generated at the output terminal of the difference computing circuit 510 is given by:

$$V_{01}=I_{sh}\cdot\tau\cdot C_{12}/C_{11}\cdot C_{13} \quad (8)$$

By setting the capacitances of the capacitors $C_{12}$ and $C_{13}$ to an equal value, the following equation can be obtained.

$$V_{01}=I_{sh}\cdot\tau/C_1 \quad (9)$$

The distance computing circuit 600 computes a photo-current $I_{sh1}$ based on the voltage $V_{O1}$ outputted from the noise cancellation circuit connected to the output electrode 201, and also computes a photo-current $I_{sh2}$ based on the voltage $V_{O2}$ outputted from the noise cancellation circuit connected to the output electrode 202. Each of the photo-currents $I_{sh1}$ and $I_{sh2}$ is in proportion to the incident position of the reflection light spot. Therefore, by the distance computation made based on the photo-currents $I_{sh1}$ and $I_{sh2}$, a distance can be obtained.

Figure 1:
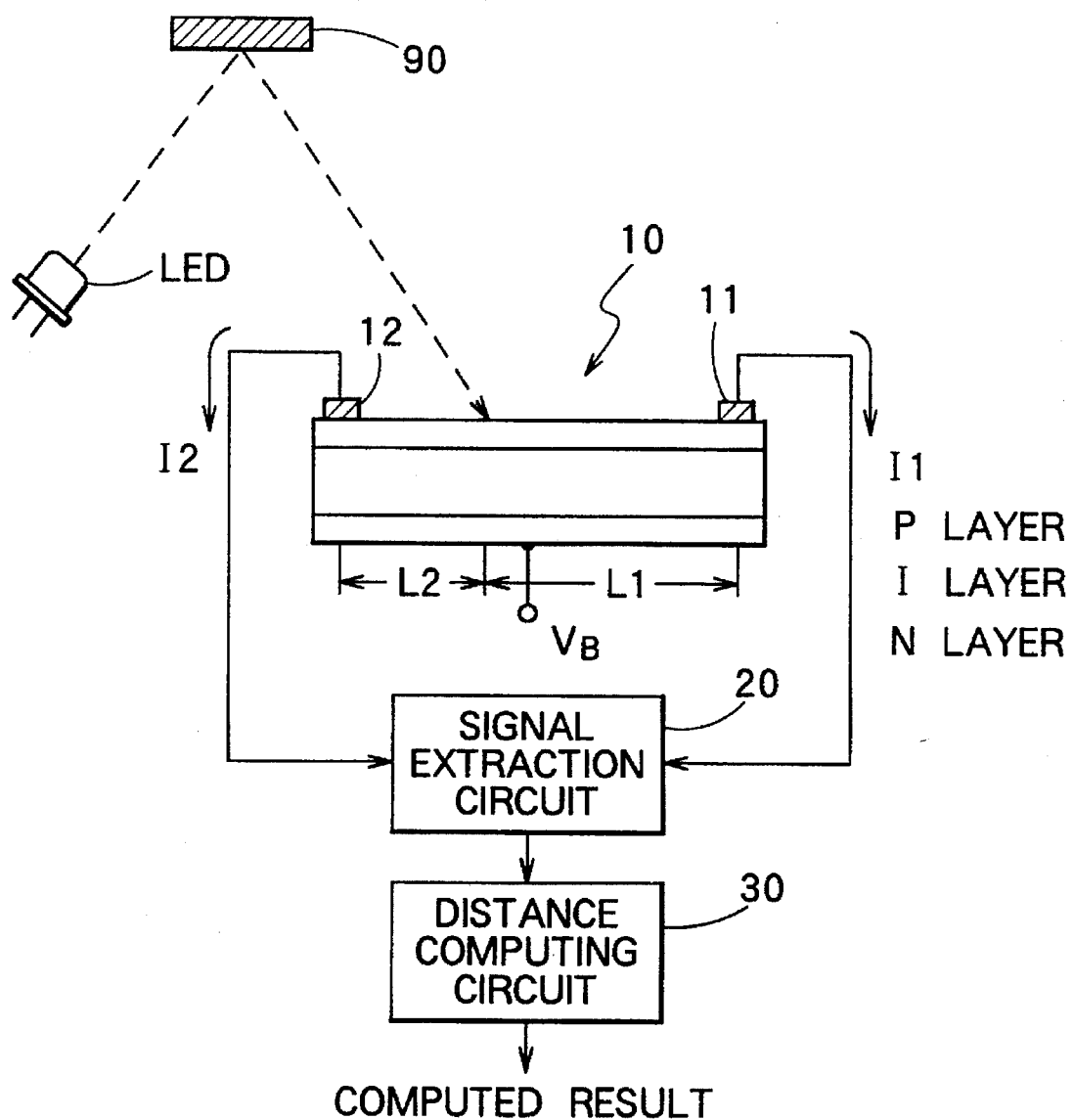
FIG. 1 shows an arrangement of a conventional distance measuring device.
Figure 2:
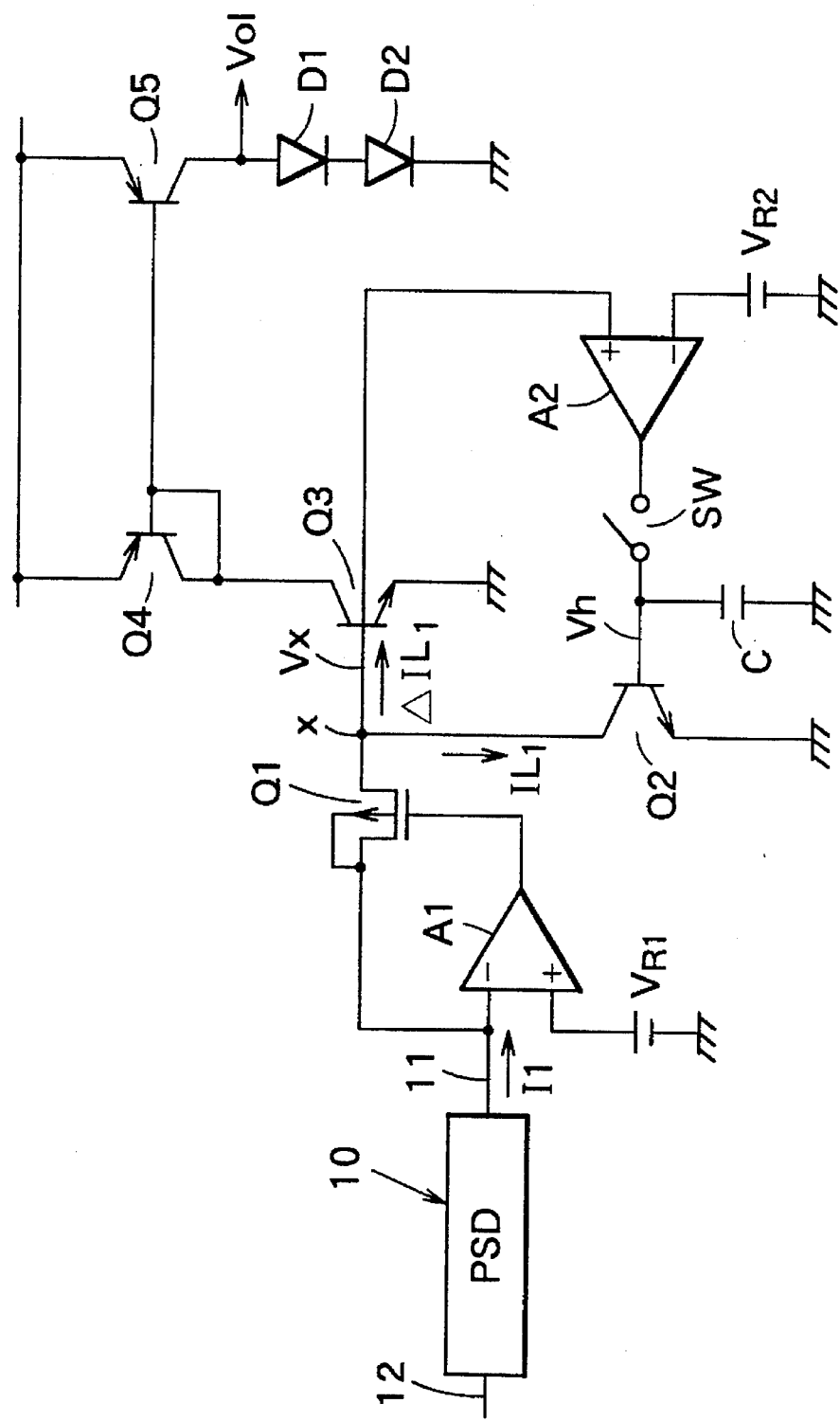
FIG. 2 is a circuit diagram showing a noise cancellation circuit used in conjunction with the device shown in FIG. 1.
Figure 3:
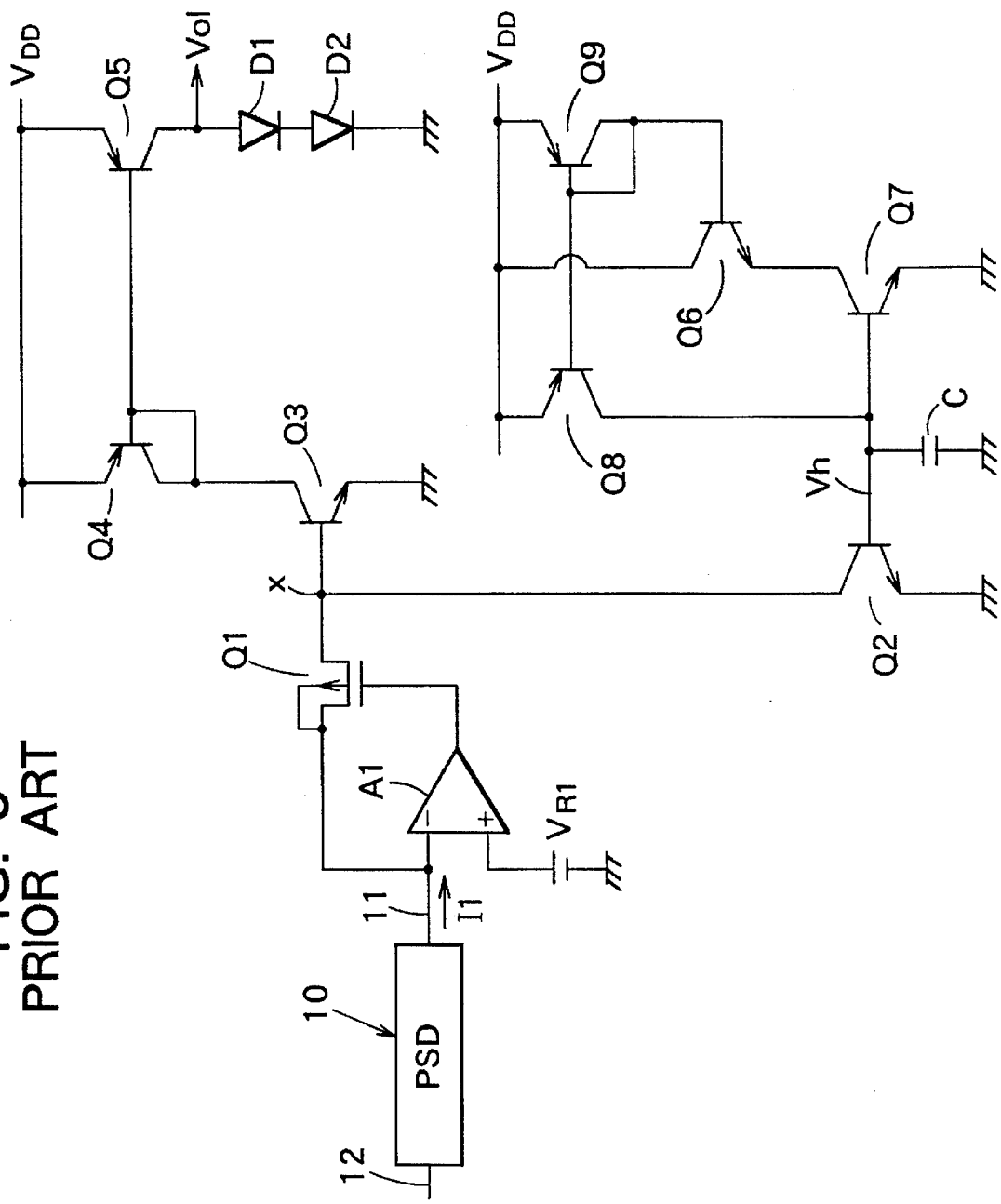
FIG. 3 is a circuit diagram showing another noise cancellation circuit used in conjunction with the device shown in FIG. 1.
Figure 4:
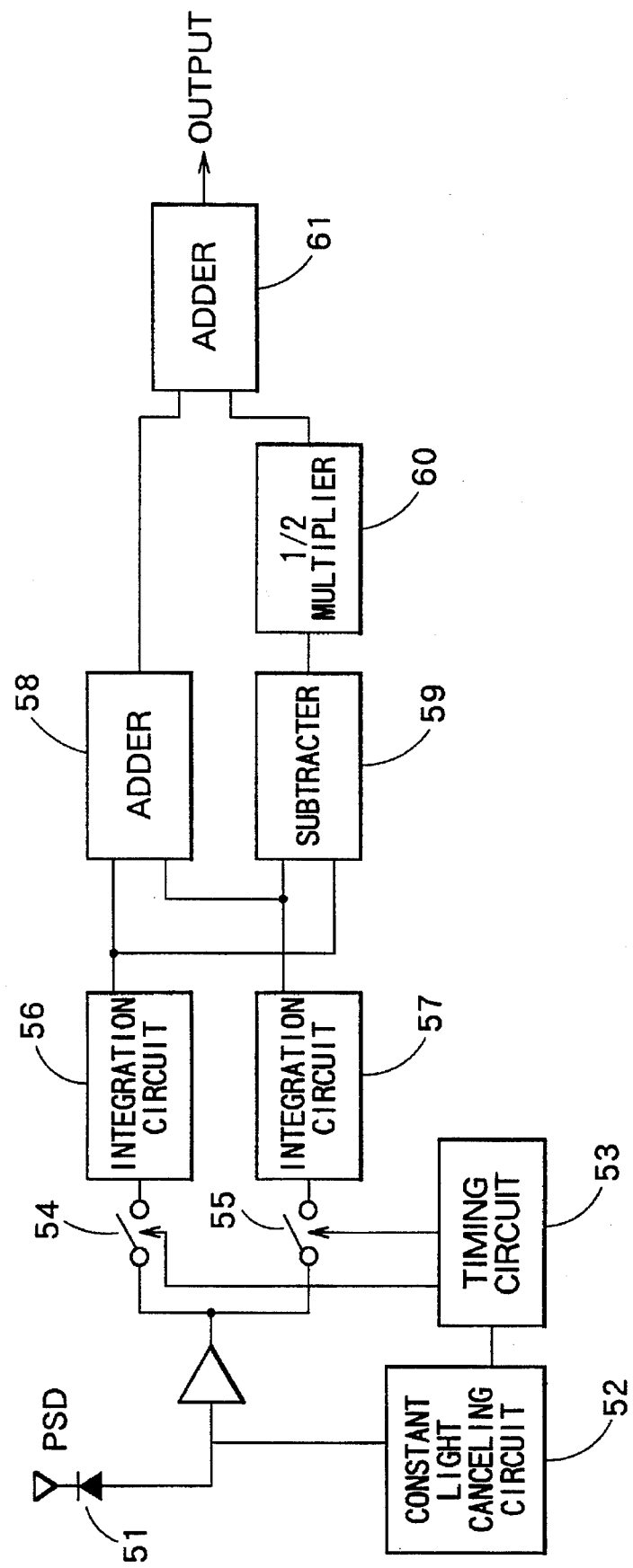
FIG. 4 shows an arrangement of another conventional distance measuring device.

As described, according to this embodiment, the incident position of the reflection light spot can be obtained regardless of temperature and without need for performing reverse logarithmic operation as is the case in prior art. Therefore, the distance can be obtained through simple computing processes. Although the capacitors $C_{11}$ through $C_{13}$ are required, they do not need to be of a large capacitance as in the prior art (see FIG. 2). The capacitors $C_1$ through $C_{13}$ may have a capacitance of about 1 pF, so an integrated circuit can easily be formed. Because the distance computation according to the invention is not affected by the variation in the circuit components, a highly accurate distance measurement can be accomplished and the components can easily be formed into an integrated circuit.

When the output voltage from the integration circuit is small in regards to the light spot, i.e., when the incident light is minute, preservation of the intended measurement accuracy becomes difficult. To eliminate such a difficulty, it is preferable that the output level from the difference computing circuit be determined in advance of performing addition and/or substraction using, for example, a comparator to obtain the results of addition or subtraction in the form of an amplified value. This means can select, for example, a feedback capacitance, thereby enhancing an accuracy of normalization.

As described in detail, the distance measuring device of the present invention can eliminate the components resulting from the changes in the background light through a charge coupling by the integration circuit and the capacitors after the current corresponding to the average background light is canceled at the output terminal of the light receiving element, and obtains only the light component resulting from the prescribed subject. Therefore, a single integration circuit suffices, and further a highly accurate distance measurement can be performed without need for complicated addition or subtraction computing circuits.

Because, in the prior art, it was difficult to maintain the base voltage at substantially constant during irradiation of the light spot and it was also difficult to provide equal characteristic transistors, it was extremely difficult to accurately derive the background light component. However, according to the present invention, the average background light is canceled, and the background light variation occurring immediately before light irradiation is performed is also canceled with the use of the integration circuit, therefore, a high accuracy can be preserved.

When computation of position detection is to be performed at a high speed according to a prior art technique, two photo-currents are applied separately to the analog logarithmic converters and a difference between the resultant signals is computed. According to such a prior art technique, an influence of temperature is indispensable. According to the present invention, however, such a problem does not arise because temperature-dependent components are not present.

In addition, unlike the conventional system in which characteristics of a bi-polar transistor circuit is used, the circuit according to the present invention can be implemented entirely with MOS transistors. Because a large capacitance is not necessary, which prevents formation of the circuit components into an array, small sizing and thus formation of a large scale array can be achieved.

Figure 8:
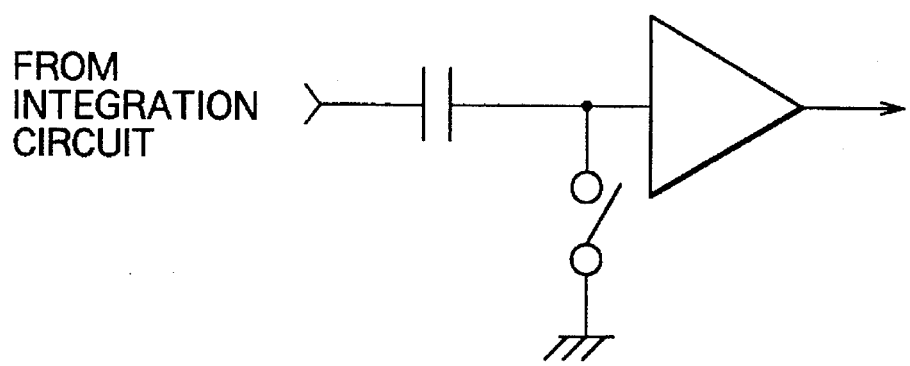
FIGS. 8(a) and 8(b) are circuit diagrams showing modifications of a difference computing circuit incorporated in the circuit shown in FIG. 6.
Figure 8:
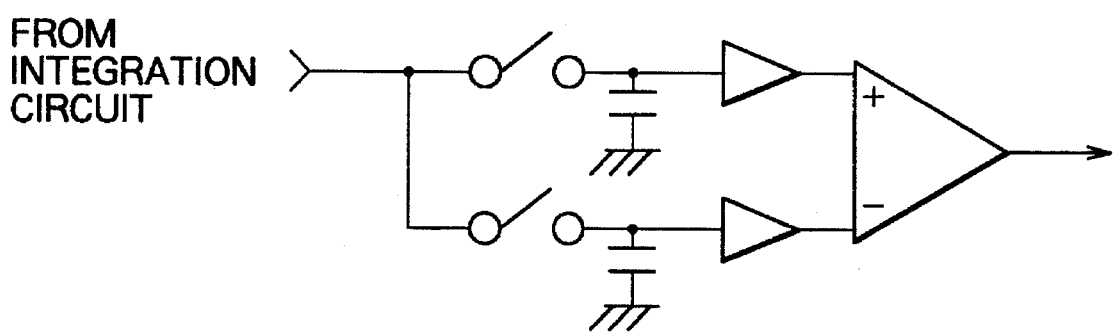
Figure 9:
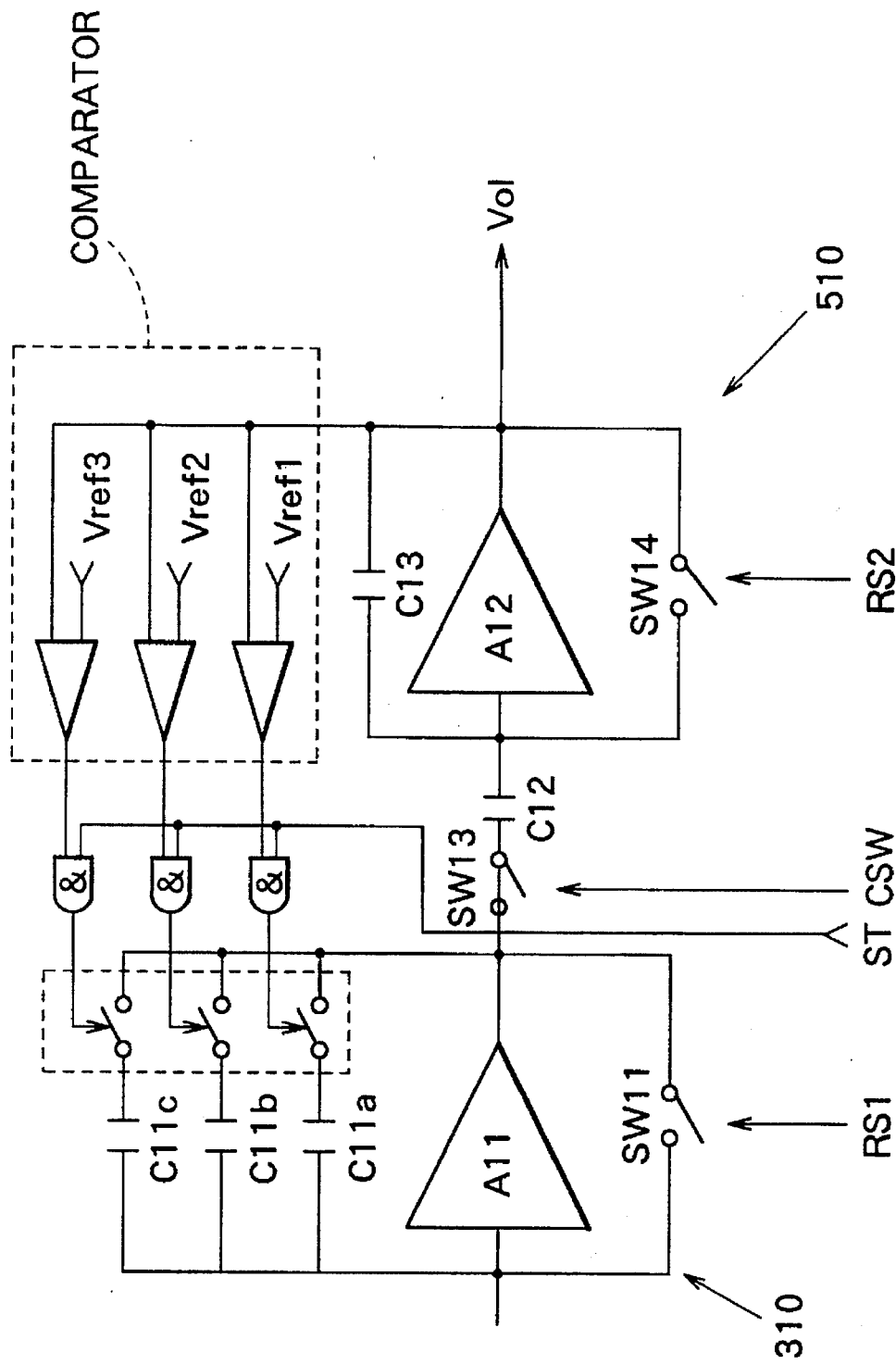
FIG. 9 is a circuit diagram showing a modification of a circuit to be incorporated in the circuit shown in FIG. 6.

While only one exemplary embodiment of this invention has been described in detail, those skilled in the art will recognize that there are many possible modifications and variations which may be made in this exemplary embodiment while yet retaining many of the novel features and advantages of the invention. For example, in the embodiment described, the difference computing circuit is constructed with a clamp-and-hold circuit which applies the principle of an integration circuit. However, the difference computing circuit may be a clamp-and-hold circuit of the type shown in FIG. 8(a), or may be a circuit of the type as shown in FIG. 8(b) which provides an output difference between two holding circuits.

What is claimed is:

1. A distance measuring device comprising:

a light emitting element for emitting light when said light emitting element is turned ON in response to a light emission instruction;

a light receiving element having a light receiving surface, a first output terminal, and a second output terminal, said light receiving surface receiving reflection light, that is emitted from said light emitting element and reflected from an object to be distance measured, and background light, that comes from a background of the object, and photoelectrically converting the reflection light to a reflection current and the background light to a background current, the reflection current being divided into a first reflection current and a second reflection current, the background current being divided into a first background current and a second background current, the first reflection current and the first background current being outputted from the first output terminal, the second reflection current and the second background current being outputted from the second output terminal;

a first cancellation circuit operatively connected to the first output terminal of said light receiving element, for canceling a first reference background current from a current outputted from the first output terminal of said light receiving element and outputting a first modified current in response to a first cancellation instruction;

a first integration circuit having an input terminal supplied with the first modified current and an output terminal, said first integration circuit integrating the first modified current for a first predetermined period of time during which time said light emitting element is turned OFF and outputting a first pre-integrated value, said first integration circuit thereafter integrating the first modified current for the first predetermined period of time during which time said light emitting element is turned ON and outputting a first post-integrated value, in response to a first integration instruction;

a first difference computing circuit operatively connected to the output terminal of said first integration circuit, for computing a difference between the first pre-integrated value and the first post-integrated value and outputting a first distance information signal in response to a first computing instruction;

a second cancellation circuit operatively connected to the second output terminal of said light receiving element, for canceling a second reference background current from a current outputted from the second output terminal of said light receiving element and outputting a second modified current in response to a second cancellation instruction;

a second integration circuit having an input terminal supplied with the second modified current and an output terminal, said second integration circuit integrating the second modified current for a second predetermined period of time during which time said light emitting element is turned OFF and outputting a second pre-integrated value, said second integration circuit thereafter integrating the second modified current for the second predetermined period of time during which time said light emitting element is turned ON and outputting a second post-integrated value, in response to a second integration instruction;

a second difference computing circuit operatively connected to the output terminal of said second integration circuit, for computing a difference between the second pre-integrated value and the second post-integrated value and outputting a second distance information signal in response to a second computing instruction;

a distance computing circuit operatively connected to both said first difference computing circuit and said second difference computing circuit, for computing a distance to the object based on the first distance information signal and the second distance information signal; and a timing generation circuit for generating the light emission instruction, the first integration instruction, the second integration instruction, the first computing instruction and the second computing instruction.

2. A distance measuring device according to claim 1, wherein said light receiving element comprises a semiconductor position sensitive light detector.

3. A distance measuring device according to claim 2, wherein a ratio of currents outputted from the first output terminal and the second output terminal of said light receiving element is determined depending on an intensity distribution of light received at said light receiving surface.

4. A distance measuring device according to claim 3, wherein the first reference background current and the second background current are determined to represent an average light intensity distribution of the background light whose light intensity distribution may change as time passes.

5. A distance measuring device according to claim 3, wherein the first reference background current is determined based on the first reflection current outputted from the first output terminal of said light receiving element for another predetermined period of time during which time said light emitting element is turned OFF, and the second reference background current is determined based on the second reflection current outputted from the second output terminal of said light receiving element for the another predetermined period of time during which time said light emitting element is turned OFF.

6. A distance measuring device according to claim 1, further comprising a first constant current source for supplying a first constant current to the first output terminal of said light receiving element, and a second constant current source for supplying a second constant current to the second output terminal of said light receiving element, and wherein said first cancellation circuit further cancels the first constant current from the current outputted from the first output terminal of said light receiving element, and said second cancellation circuit further cancels the second constant current from the current outputted from the second output terminal of said light receiving element.

7. A distance measuring device according to claim 1, wherein said first difference computing means comprises first holding means for holding the first pre-integrated value, and said second difference computing means comprises second holding means for holding the second pre-integrated value.

8. A distance measuring device according to claim 1, wherein the first predetermined period of time and the second predetermined period of time are set to equal to each other.

9. A distance measuring device according to claim 1, wherein said first cancellation circuit comprises:

a first MOS transistor having a source terminal connected to the first output terminal of said light receiving element, a drain terminal connected to ground, and a gate terminal;

a first capacitor having one terminal connected to the gate terminal of said first MOS transistor and another terminal connected to ground;

a first switch having one terminal connected to the gate terminal of said first MOS transistor and another terminal connected to the output terminal of said first integration circuit; and a first constant current source for supplying a first constant current to the source terminal of said first MOS transistor, and wherein said second cancellation circuit comprises:

a second MOS transistor having a source terminal connected to the second output terminal of said light receiving element, a drain terminal connected to ground, and a gate terminal;

a second capacitor having one terminal connected to the gate terminal of said second MOS transistor and another terminal connected to ground;

a second switch having one terminal connected to the gate terminal of said second MOS transistor and another terminal connected to the output terminal of said second integration circuit; and a second constant current source for supplying a second constant current to the source terminal of said second MOS transistor.

10. A distance measuring device according to claim 9, wherein the first constant current and the second constant current are set to equal to each other.

* * * * *